Dec. 30, 1924.

C. KNOWLES

WORK SUPPORTING AND ROTATING CHUCK

Filed Aug. 7, 1922

1,521,303

INVENTOR.
Carroll Knowles
BY Joseph K. Schofield
ATTORNEYS.

Patented Dec. 30, 1924.

1,521,303

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

WORK SUPPORTING AND ROTATING CHUCK.

Application filed August 7, 1922. Serial No. 580,267.

*To all whom it may concern:*

Be it known that I, CARROLL KNOWLES, a citizen of the United States, residing at Hartford, in the county of Hartford and State of Connecticut, have invented certain new and useful Improvements in Work Supporting and Rotating Chucks, of which the following is a specification.

The invention relates to a work driver for metal reducing machines and in particular to a work driver for cylindrical grinding machines.

An object of the present invention is to provide an improved work driver adapted for application to the non-rotating work supporting spindle of a metal reducing machine, or other type of metal working machine, which is adapted to permit quick placement of the work in operative and driving position on supporting centers and also provide rotating means therefor.

One feature which enables me to accomplish the above named objects, is that I mount a sleeve upon the fixed non-rotating spindle of the machine, the sleeve being provided with work engaging jaws, and I operate these jaws to move them into and out of operative position by axial movement of a collar loosely surrounding the sleeve.

Another principal object of the invention is that the work driver may be opened by a single movement of an operating collar and closed by movement of the collar in the opposite direction, which movement may be accomplished resiliently by springs.

Another feature, which is advantageous, is that the sleeve is loosely mounted on the spindle at its outer end so that it may adjust itself slightly relative to the spindle so that the work engaging jaws may be accurately and uniformly centered upon the periphery of the work and the work may be rotated about the axis of the fixed center.

Another object of the invention is to provide a simple and compact mechanism for mounting and rotating work in a metal reducing machine which may be readily manufactured, will take up but little room upon the end of the work spindle and which will not readily be put out of order.

A still further object of the invention is to provide rotatably mounted chuck engaging members having cam shaped work engaging surfaces, and to provide means normally rotating said members to force the cam surfaces into engagement with the work.

With these and other objects in view, my invention consists in the features of construction and operation set forth in the following specification and illustrated in the accompanying drawing.

In the accompanying drawing annexed hereto and forming a part of this specification, I have shown my invention embodied in a work driver for a cylindrical grinding machine but it will be understood that the invention can be otherwise embodied and that the drawing is not be construed as defining or limiting the scope of the invention, the claims appended to this specification being relied upon for that purpose.

In the above mentioned drawing, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: first, a work supporting spindle such as the non-rotating headstock spindle of a cylindrical grinding machine; second, a sleeve loosely surrounding said spindle so that it may be freely rotated thereon; third, work engaging members supported on the said sleeve so that they may be oscillated into and out of engagement with the work; fourth, an axially movable collar on said sleeve carrying members engaging the work engaging members and so arranged that axial movement of the collar in one direction will oscillate the work engaging members into operative position; and fifth, a sprocket member on said sleeve adapted to be connected to suitable driving means for rotating the sleeve and parts attached thereto.

Figure 1:
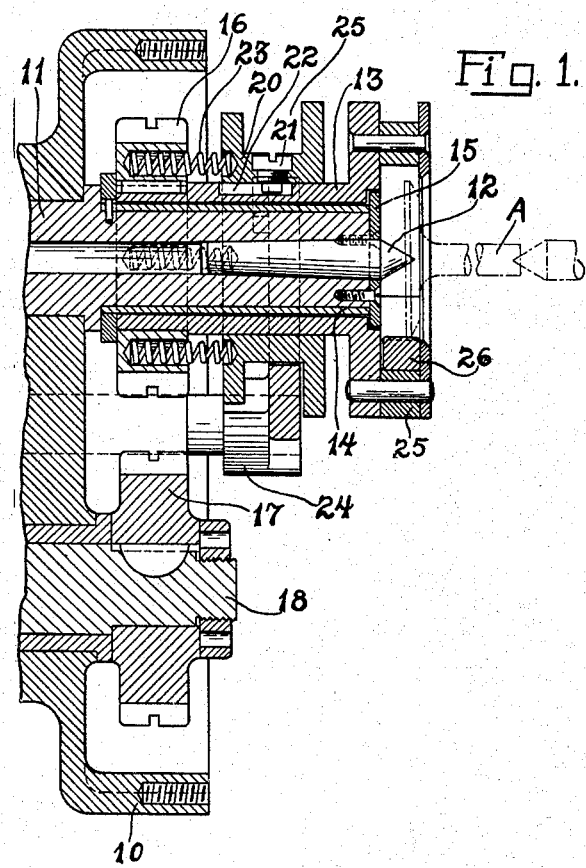
Figure 1 is a longitudinal sectional view of the complete device.

Referring more in detail to the figures of the drawing, a fragmentary part of the headstock 10 of a cylindrical grinding machine, or other metal cutting machine, is indicated having a non-rotating spindle 11 fixed therein. Within the end of this non-rotating spindle 11 is a work supporting center 12 and surrounding it is a rotatable sleeve 13. Preferably, and as shown in Fig. 1, a bushing 14 is mounted non-rotatably on the spindle 11 which may be retained in place by means of a flange 15 screwed or otherwise fastened to the outer end of the spindle 11. Loosely surrounding this bushing 14 is the rotatable sleeve 13 above referred to. It will be noted that there is a slight gradually increasing space between the bushing 14 and the sleeve 13, the outer end of the sleeve 13 adjacent the work supporting center 12 and the parts supported thereby being permitted to adjust themselves slightly relative to the axis of the spindle 11. The opposite end of the sleeve 13 closely surrounds the bushing 14 thus providing a bearing for the sprocket wheel 16.

Fixed to the sleeve 13 is the sprocket member 16 keyed or otherwise suitably fastened thereto, and below and in alignment with this sprocket wheel 16 is another sprocket wheel 17 fixed to a driving shaft 18. The two sprocket wheels 16 and 17 are adapted to be connected together so that the sleeve 13 may be rotated from the driving shaft 18 by a flexible chain 19 shown diagrammatically in Fig. 2.

Axially movable on the sleeve 13 is a collar 20 which preferably rotates with the sleeve 13 and is provided with a screw 21, the inner end of which projects within an axial groove 22 in the sleeve 13. Coiled springs 23 interposed between the sprocket wheel 16 on the sleeve 13 and the end face of the collar 20 normally urge the collar 20 in one direction. In order to move the collar 20 in the opposite direction, a rod or bar 24 having a yoke member extending into a circumferential groove in the collar 20 is provided which may be moved in either direction by means not shown. Preferably, but not necessarily, the collar 20 is urged by means of the springs 23 in a direction which will have the effect of moving the work engaging jaws of the driver into operative position so that normally the driver is held in position to drive the work.

Figure 2:
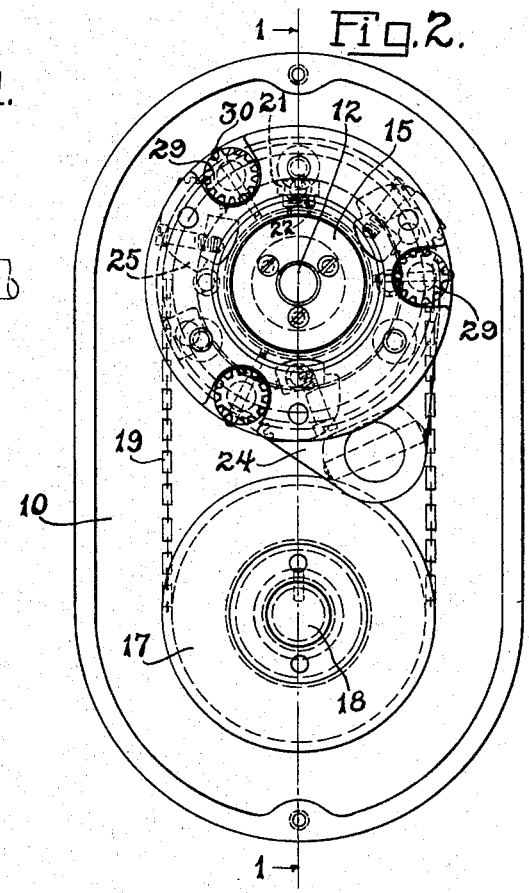
Fig. 2 is a front view of the same.
Figure 3:
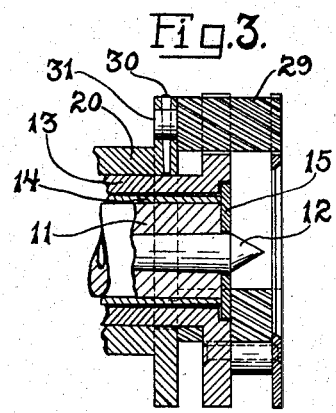
Fig. 3 is a sectional view taken on line 3—3 of Fig. 4.
Figure 4:
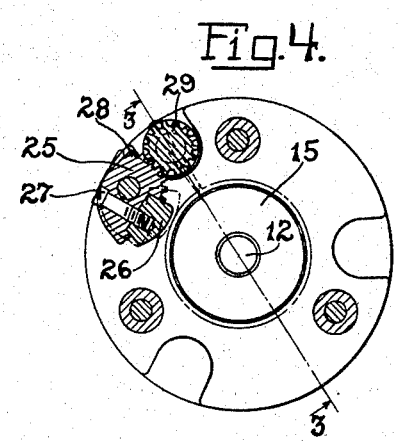
Fig. 4 is a fragmentary front view partly in section showing the means for operating a work engaging member.

Mounted on the forward end of the sleeve 13 in a manner to be oscillated are work engaging members 25 preferably having work engaging jaws 26 fastened thereto as by the screws 27 shown in Figs. 2 and 4. One portion of the work engaging and driving members 25 is provided with teeth 28 so that by engagement of these teeth, oscillation of the driving member 25 into or out of operative position may conveniently be accomplished. The work engaging surfaces of the jaws 26 are so formed that when the members 25 are oscillated the jaws tend to tightly grip and drive the work A.

Mounted on and extending from the collar 20 are actuating members 29 for the driving members 25. These, as shown, comprise members having spirally curved portions which are keyed or otherwise fastened into the forward face of the collar 20. As shown, three of these members 29 are provided corresponding in number to the number of driving members 25. It will be seen from this construction, that movement of the collar 20 in one direction will advance the spirally curved members 29 so that the driving members 25 in engagement therewith will be oscillated in accordance with the spiral of the curves on the actuating members 29. Thus the driving members 25 will be moved from inoperative to operative position or vice versa by movement of the collar 20. As shown, movement of the collar 20 toward the right, in which direction it is forced by the springs 23, moves the driving members 25 into engagement with the work A and, as the collar 20 is normally forced in this direction, the work jaws 26 will normally be held in their operative or driving position. Movement of the collar 20 to the left by means of the yoke member on the bar 24 indicated, serves to rotate the driving members 25 and their jaws 26 out of engagement with the work A.

For convenience in making them, the actuating members 29 for driving the work engaging members 25 are in the form of helical gears and so may be made by any process suitable for making gears of this type. As shown, they are directly fastened to the sleeve 20 by pins 30 extending transversely through an extension 31 of these actuating members 29.

It will thus be seen that I have provided a construction of driver for work in a cylindrical grinding or other machine which may adjust itself relative to the work A and which will drive the work by means of members resiliently forced into engagement with the work. The construction also permits operation of one member in one direction to release the work driving members 25 and hold them in their open or inoperative positions while the completed work is being removed and new blanks substituted.

What I claim is:

1. A work driver for metal reducing machines, comprising in combination, a spindle, a sleeve rotatably mounted thereon, an axially movable collar on said sleeve, rotatable work engaging members supported on said sleeve, and means operated by axial movement of the collar to move the work engaging members into operative position.

2. A work drive for metal reducing machines, comprising in combination, a spindle, a work supporting center thereon, a sleeve rotatably mounted on the spindle, an axially movable collar on said sleeve, rotable work engaging members supported on said sleeve, and means operated by axial movement of the collar to move the work engaging members into operative position.

3. A work driver for metal reducing machines, comprising in combination, a spindle, a sleeve loosely surrounding the spindle and rotataby mounted thereon, an axially movable collar on said sleeve, rotatable work engaging members supported on said sleeve, and means operated by axial movement of the collar to move the work engaging members into operative position.

4. A work driver for metal reducing machines, comprising in combination, a spindle, a sleeve rotatably mounted thereon, an axially movable collar on said sleeve, work engaging members supported on said sleeve, means operated by axial movement of the collar to move the work engaging members into operative position, and resilient means normally forcing said collar in one direction.

5. A work driver for metal reducing machines, comprising in combination, a spindle, a sleeve rotatably mounted thereon, an axially movable collar on said sleeve, work engaging members supported on said sleeve, means operated by axial movement of the collar to move the work engaging members into operative position, resilient means normally forcing said collar in one direction, and positively acting means to force the collar in the opposite direction.

6. A work driver for metal reducing machines, comprising in combination, a spindle, a sleeve rotatably mounted thereon, an axially movable collar on said sleeve, work engaging members supported on said sleeve, and members fixed to said collar and adapted, when the collar is moved axially, to move the work engaging members into operative position.

7. A work driver for metal reducing machines, comprising in combination, a spindle, a sleeve rotatably mounted thereon, an axially movable collar on said sleeve, work engaging members supported on said sleeve, and a plurality of spirally grooved members fixed to said collar and adapted, when the collar is moved axially, to move the work engaging members into operative position.

8. A work driver for metal reducing machines, comprising in combination, a spindle, a sleeve rotatably mounted thereon, an axially movable collar on said sleeve, work engaging members supported on said sleeve, and members fixed to said collar and adapted, when the collar is moved axially, to move the work engaging members into or out of operative position.

9. A work driver for metal reducing machines, comprising in combination, a spindle, a sleeve rotatably mounted thereon, an axially movable collar on said sleeve, work engaging members supported on said sleeve, and a plurality of spirally grooved members fixed to said collar and adapted, when the collar is moved axially to oscillate the work engaging members into operative position.

10. A work driver for metal reducing machines, comprising in combination, a spindle, a sleeve rotatably mounted thereon, an axially movable collar on said sleeve, work engaging members supported on said sleeve, a plurality of spirally grooved members fixed to said collar and adapted, when the collar is moved axially, to move the work engaging members into operative position, and means to move said collar in either direction.

11. A work driver for metal reducing machines, comprising in combination, a fixed spindle, a work supporting center thereon, a sleeve rotatably mounted on the spindle, an axially movable collar on said sleeve, work engaging and driving members supported on said sleeve, means to rotate said sleeve, and means operated by axial movement of the collar to move the work engaging and driving members into operative position.

12. A work driver for metal reducing machines, comprising in combination, a fixed spindle, a work supporting center thereon, a sleeve rotatably mounted on the spindle, an axially movable collar on said sleeve, work engaging and driving members supported on said sleeve, means to rotate said sleeve, and means having spirally disposed portions operated by axial movement of the collar to oscillate the work engaging members into operative position.

13. A work driver for metal reducing machines, comprising in combination, a fixed spindle, a work supporting center thereon, a sleeve rotatably mounted on the spindle, an axially movable collar on said sleeve, work engaging and driving members supported on said sleeve, means to rotate said sleeve, and resilient means to axially move the collar to normally hold the work engaging members in operative position.

14. A work driver for metal reducing machines, comprising in combination, a fixed spindle, a work supporting center thereon, a sleeve rotatably mounted on the spindle, an axially movable collar on said sleeve, means to rotate said sleeve, work engaging members supported on said sleeve, members fixed to said collar and engaging the work driving means adapted when the collar is moved axially to move the work engaging members into operative position, resilient means forcing said collar in one direction, and means to move said collar in the opposite direction.

15. A work driver for metal reducing machines, comprising in. combination, a fixed spindle, a work supporting center thereon, a sleeve rotatably mounted on the spindle, an axially movable collar on said sleeve, means to rotate said sleeve, work engaging members supported on said sleeve, a plurality of spirally grooved members fixed to said collar and engaging the work driving means adapted when the collar is moved axially to oscillate the work engaging members into operative position, resilient means forcing said collar in one direction, and means to move said collar in the opposite direction.

In testimony whereof, I hereto affix my signature.

CARROLL KNOWLES.